United States Patent [19]

Ozawa et al.

[11] Patent Number: 4,635,910

[45] Date of Patent: Jan. 13, 1987

[54] FLUID-FILLED DAMPER DEVICE

[75] Inventors: Isao Ozawa; Noboru Ito, both of Aichi; Masaaki Takizawa, Shizuoka; Yoshio Ohta, Shizuoka; Kiyoteru Ijichi, Shizuoka, all of Japan

[73] Assignees: Toyoda Gosei Co., Ltd.; Toyota Jidosha Kabushiki Kaisha, both of Aichi, Japan

[21] Appl. No.: 729,177

[22] Filed: May 1, 1985

[30] Foreign Application Priority Data

May 3, 1984 [JP] Japan .................................. 59-89085

[51] Int. Cl.$^4$ ............................................. F16M 5/00
[52] U.S. Cl. ................................. 267/140.1; 248/562
[58] Field of Search .............. 248/562, 563, 550, 566, 248/615, 621, 631, 632, 634, 635, 636, 638, 659; 188/285, 299; 267/8 R, 140.1, 141, 140.3, 141.1, 141.2, 35, 113, 118

[56] References Cited

U.S. PATENT DOCUMENTS

| | | | |
|---|---|---|---|
| 4,159,091 | 6/1979 | Le Salver | 248/634 |
| 4,161,304 | 7/1979 | Brenner | 248/562 |
| 4,383,679 | 5/1983 | Kakimoto | 248/634 |
| 4,420,060 | 12/1983 | Kakimoto | 267/140.1 |

FOREIGN PATENT DOCUMENTS

| | | | |
|---|---|---|---|
| 40290 | 11/1981 | European Pat. Off. | 267/140.1 |
| 115417 | 8/1984 | European Pat. Off. | 267/140.1 |
| 3225700 | 11/1983 | Fed. Rep. of Germany | 267/140.1 |
| 129944 | 8/1982 | Japan | 248/566 |
| 2041485 | 9/1980 | United Kingdom | 267/140.1 |
| 2041488 | 9/1980 | United Kingdom | 267/140.1 |

*Primary Examiner*—J. Franklin Foss
*Assistant Examiner*—Robert A. Olson
*Attorney, Agent, or Firm*—Oblon, Fisher, Spivak, McClelland, & Maier

[57] ABSTRACT

A damper device including first and second support members, one of which is fixed to a support element and the other of which is fixed to a suspended element, an elastic block made of a deformable, elastic material for elastically coupling the two support members and a sealed space formed therein filled with a liquid. One partition member has its periphery fixed to the first support member and divides the sealed space into two chambers. The partition member has therein a member movable along a short distance. Fluid passages are formed in a wall portion of the first support member so as to communicate between the two chambers and to impart flow resistance to the liquid flowing therethrough. The partition member can be suspended to the first support member by an elastic sheet and be movable along the axial direction of the first support member. A solenoid is mounted on the inner wall of the first support member. When the solenoid is energized, the partition member can be fixed to the first support member. When the damper device is used in an engine suspension of a vehicle with vibrations of high frequency and small magnitude of vibration, relative movement of the first and second support members is damped by displacement of the movable member of the partition member. With low-frequency vibrations, vibrations having a relatively large magnitude are damped by the flow resistance of the liquid flowing through the fluid passages. When the engine is in the idling mode, the solenoid is deenergized, and the partition member is kept movable.

3 Claims, 6 Drawing Figures

FLUID-FILLED DAMPER DEVICE

BACKGROUND OF THE INVENTION

1. Field of the Invention

The present invention relates to a damper device for damping vibrations transmitted from one to the other of a support element and a suspended element when a heavy element as a source of such vibrations is supported on the support element or when such element is supported on and fixed by the support element to which external vibrations are apt to be transmitted. The damper device of the present invention is suitably adapted for supporting and fixing an engine to a body or a frame of a vehicle.

2. Description of the Prior Art

In a damper device, in particular, in a damper device to be used in an engine suspension of a vehicle, a thick, elastic member such as a rubber block is normally used. However, such a block generally has high flexibility and elasticity. For this reason, the block cannot always provide a good damper effect against vibrations of frequencies and magnitudes of vibration within wide ranges.

A conventional damper device is disclosed in U.S. Pat. No. 4,159,091, DE Pat. No. 2,727,244. In this device, a sealed space is defined by a rubber block and two frame plates. The sealed space is partitioned into two chambers by a partition wall which is fixed to one frame plate and which has a movable member and an orifice formed therein. A liquid is filled in the sealed space to a level such that at least the partition wall is immersed in the liquid. When vibrations are transmitted to the block, if such originated from an engine in operation and have a high frequency and a very small magnitude of vibration, a change in volume in one chamber upon deformation of the rubber block is compensated for by displacement of the movable member in the partition wall and stiffness of the rubber block is kept very low. On the other hand, if the vibrations transmitted to the rubber block are of a low frequency and a large magnitude, such as cranking vibrations of an engine, a change in volume of one chamber is used to cause the liquid to flow from the one chamber into the other chamber through the orifice formed in the partition wall, and stiffness of the rubber block is significantly increased by liquid flow resistance through the orifice.

In the above-mentioned damper device, in order to damp vibrations having a magnitude of vibration exceeding 0.5 mm, the liquid is allowed to flow from one chamber to the other chamber through the orifice formed in the partition wall, and the flow resistance obtained upon liquid flow is utilized to provide a damper effect. However, the orifice is formed in the movable member comprising a thin plate of a rigid material such as metal or an elastic material such as rubber. Alternatively, the orifice is defined by a gap between a circular hole formed in the movable member and a pin inserted into the circular hole and fixed to the rubber block or blocks. Since the flow resistance of the liquid flowing through the orifice is determined by the effective passage cross-sectional area of the orifice and its length, if an orifice is formed in a thin plate, the effective cross-sectional area must be accurately set since the length of the passage is limited by the thickness of the thin plate. If an orifice is defined by a gap between a circular hole and a pin, a high machining accuracy of the circular hole in the movable member and the outer circumferential surface of the pin is necessary. In addition, when the movable member and the pin slide against each other, the effective passage cross-sectional area changes due to wear. For this reason, it is difficult to correctly set the flow resistance of the liquid through the orifice, and machining and assembly of respective components require high precision.

SUMMARY OF THE INVENTION

It is a primary object of the present invention to provide a fluid-filled damper device of the type as described above having a sealed space defined by a deformable, elastic block and two frame members, a partition wall for dividing said sealed space into two chambers and a fluid passage communicating said two chambers and imparting flow resistance to flow of liquid flowing therethrough caused by the deformation of said elastic block, wherein determination of said flow resistance is made easily in accordance with a combination of length cross-sectional area and member of the fluid passage and further machining of said fluid passage is easily made.

It is a further object of the present invention to provide a fluid-filled damper device for use as an engine suspension of a vehicle wherein the partition wall as described above is not fixed to the frame member but is suspended in the sealed space by means of an elastic sheet consisting of a flexible, elastic material, characterized in that, when a damper effect utilizing the flow resistance of the liquid sealed inside the sealed space is not required, e.g., in the idling mode of an engine, the partition wall is not fixed to the frame plate; when the damper effect utilizing the liquid in the sealed space is required, e.g., in the travel mode of the vehicle, the partition wall is attracted by a solenoid fixed to one frame plate to be adherently held thereto and vibrations are damped by only causing a movable plate to move or flow resistance is imparted to the liquid flowing from one chamber to the other chamber through the fluid passages formed in the one frame plate.

The present invention basically relates to a fluid-filled damper device comprising two support members, one of which is coupled to a support element and the other of which is coupled to a suspended element; a thick elastic block which is fixed by an outer peripheral edge thereof to a first support member between the two support members and by a substantially central portion thereof to a second support member between the two support members so as to elastically couple the first and second support members for allowing relative movement therebetween in at least one direction; a sealed space surrounded by at least the elastic block, an elastic bottom plate closing an end of the first support member which is opposite to the side of the second support member and the first support member; liquid filled in said sealed space; and a partition member which divides the sealed space into first and second chambers and has therein a movable member movable by a slight distance in one direction of the relative movement of the first and second support members.

According to the present invention, there is provided a fluid-filled damper device wherein the partition member is fixedly supported at its periphery by the first support member, and at least one fluid passage is formed in a wall portion constituting the first support member, the fluid passage communicating the first and second chambers of the sealed space partitioned by the partition member and imparting a flow resistance to the liquid passing therethrough.

According to the present invention, there is further provided a fluid-filled damper device wherein a solenoid is arranged at an inner wall of the first support member, a central portion of the solenoid has an opening, and an attraction/fixing surface of the solenoid is positioned substantially perpendicular to one direction of relative movement between the first and second support members; the partition member is inserted between the attraction/fixing surface of the solenoid and the elastic block; the partition member is fixed at its outer peripheral edge to an inner peripheral edge of an elastic sheet which is made of a deformable, elastic material, and an outer peripheral edge of the elastic sheet is fixed to the first support member so as to suspend the partition member to be movable along said one direction of relative movement between the first and second support members; at least one fluid passage is formed in the wall portion constituting the first support member, each of ends of said fluid passage opens to the sealed space at each of the both side positions of the attraction/fixing surface of the solenoid with respect to said one direction of relative movement between the first and second support members, respectively, and imparting a flow resistance to the liquid flowing therethrough; and the partition member is attracted to and fixed in position by the solenoid against the elasticity of the elastic sheet so as to divide the sealed space into first and second chambers and to communicate the first and second chambers with each other when the solenoid is energized.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DESCRIPTION OF THE PREFERRED EMBODIMENTS

Figure 1:
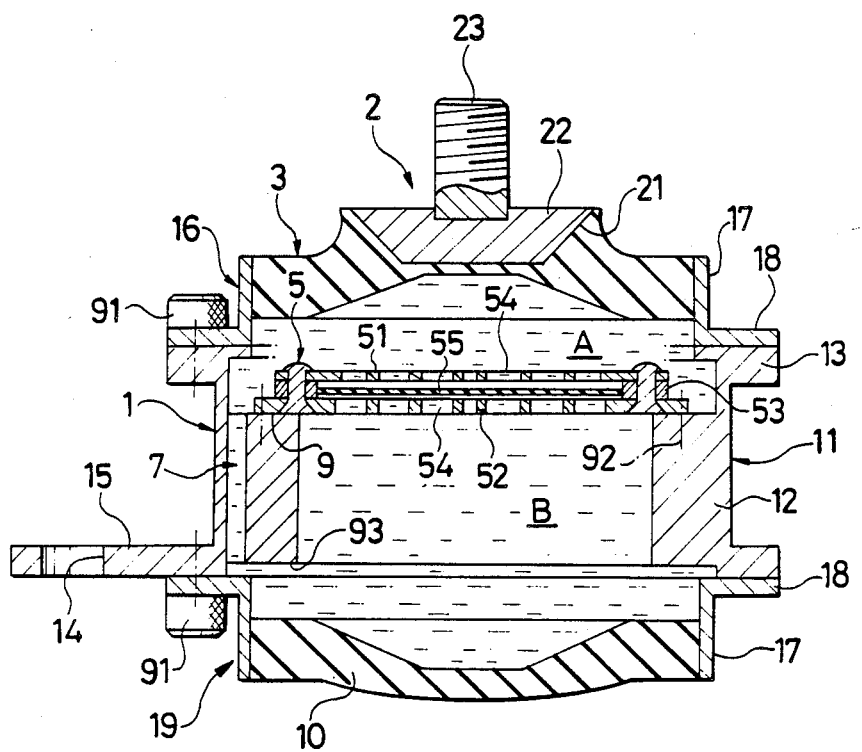
FIG. 1 is a sectional view showing a first embodiment of the present invention.

FIG. 1 is a sectional view of a first embodiment of the present invention wherein the present invention is applied to a fluid-filled damper device as an engine suspension for supporting and fixing an engine to a body or a frame of a vehicle.

A first support member 1 for mounting on the body or frame of the vehicle comprising a main frame 11, an upper frame 16, and a lower frame 19. The main frame 11 has a main portion formed into a thin cylindrical base portion 12 and has at its one open end (along the axial direction) a flange 13 and at its other open end a mounting flange 15 which has a substantially flat triangular shape and which has a mounting hole 14 for receiving a mounting bolt for mounting on the body or frame. The upper frame 16 comprising a cylindrical portion 17 extending concentrically with the main frame 11, and a flange 18 formed at one open end of the cylindrical portion 17. The lower frame 19 has a cylindrical portion 17 and a flange 18 similar to that of the upper frame 16. The main, upper and lower frames 11, 16 and 19, respectively, made by a metallic material. Bolts 91 liquid-tightly fasten between the flange 13 of the main frame 11 and the flange 18 of the upper frame 16 and between the mounting flange 15 of the main frame 11 and the flange 18 of the lower frame 19.

A second support member 2 for mounting on the vehicle engine comprises a metal support member main body 22 formed into a block-shape having a frustoconical surface 21, and a bolt 23 which is to be inserted into a hole formed in a support frame of the engine block and fixes the main body 22 to the engine block together with a nut. The bolt 23 extends from the support member main body 22 to be coaxial with the frustoconical surface 21 of the main body 22 and is fixed to the main body 22.

A thick elastic block (a rubber block 3 in this embodiment) is fixed between the frustoconical surface 21 of the second support member main body 22 of the second support member 2 and the inner wall of the cylindrical portion 17 of the upper frame 16 of the first support member 1. The mean surface of the rubber block 3 is arranged in a plane perpendicular to the central axis of the inner circumferential surface of the cylindrical base portion 12 of the main frame 11. The outer circumferential surface of the rubber block 3 is fixed to the inner wall of the cylindrical portion 17 of the upper frame 16. The support member main body 22 is buried into the central portion of the rubber block 3 such that the bolt 23 of the second support member 2 is coaxial with the central axis of the inner circumferential surface of the cylindrical base portion 12. With this arrangement, the first and second support member 1 and 2 are coupled by the elasticity of the rubber block 3 such that they are movable mainly along the above-mentioned central axis.

A bottom plate made of a deformable, elastic material and formed into a disk-like shape, e.g., a rubber bottom plate 10, is fixed at its outer circumferential surface to the inner wall of the cylindrical portion 17 of the lower frame 19 of the first support member 1 so as to close an end of the first support member 1 which is opposite to the second support member 2 by the rubber bottom plate 10. In this manner, a sealed space is defined by the rubber block 3, the first support member 1 and the rubber bottom plate 10. A liquid, e.g., water is filled in the sealed space.

The cylindrical base portion 12 of the main frame 11 is thick. At an end of the cylindrical base portion 12 which is located at the side of the upper frame 16 fixing the rubber block 3, a stepped portion 9 is formed to have an increased inner diameter at the side of the upper frame 16 as compared to that of main portion of the base portion 12 and has a surface perpendicular to the central axis of the base portion 12. A partition member 5 is fixed at its outer periphery to and on said surface of the stepped portion 9 with screws 92 (not shown: only central axes thereof are illustrated). The partition member 5 divides the sealed space into a first chamber A formed between the partition member 5 and the rubber block 3 and a second chamber B defined between the partition member 5 and the rubber bottom plate 10. The partition member 5 comprises two thin, substantially disk-shaped flat plates 51 and 52 and a spacer 53 made of synthetic resin interposed therebetween. The spacer 53 is formed in an annular shape having an outer diameter substantially the same as that of the plate 51. A number of through holes 54 are formed in the plates 51 and 52, within a range corresponding to the inner diameter of the cylindrical base portion 12. A movable member 55 in the form of a thin disk-shaped plate is arranged in the space defined by the spacer 53 and the plates 51 and 52. The movable member 55 is movable along a direction perpendicular to the surfaces of the plates 51 and 52, i.e., along the central axis of the inner wall of the cylindrical base portion 12. The movable member 55 is preferably made of a flexible, elastic material such as a synthetic resin or a solid material and has an outer diameter slightly smaller than the inner diameter of the spacer 53. The possible displacement of the movable member 55 along the above-mentioned central axis is limited to about 5 mm or less, which roughly corresponds to the difference between the distance between the plates 51 and 52 and the thickness of the movable member 55.

One or passages 7 are formed in the thick cylindrical base portion 12 of the main frame 11 at a position or positions radially outward from the outer peripheral edge of the partition member 5 and extend parallel to the central axis of the base portion 12 from the surface of the stepped portion 9. The fluid passage 7 communicates the first and second chambers A and B with each other. The cross-sectional area and length of the fluid passage 7 is determined such that a predetermined flow resistance is imparted to the liquid flowing therethrough (the flow resistance is determined by the cross-sectional area of the passage and its axial length). When the passage is formed by grinding or polishing using a tool, the cross-sectional area of the passage 7 is determined by the outer diameter of the tool used, and the length of the passage 7 is determined by the position of the stepped portion 9 formed on the cylindrical base portion 12 along its central axis. Fine adjustment of the length of the fluid passage 7 can be easily performed by forming a second stepped portion 93 at a portion of the cylindrical base portion 12 which is near the lower frame 19. When the flange 18 of the lower frame 19 interferes with the fluid passage 7, the second stepped portion 93 effectively allows flow of the liquid between the first and second chambers A and B.

The functions and advantages of this embodiment will be described below. The first support member 1 is mounted on the body or frame of a vehicle by means of the mounting flange 15, and the second support member 2 is fixed to the engine by the bolt 23. When vibrations occur in the body of the vehicle due to vibrations of the engine or an uneven road surface, the rubber block 3 is deformed to allow the first and second support members 1 and 2 to move relative to each other. Upon this relative movement, the volume and internal pressure of each of the chambers A and B change. Then, the liquid filled in the sealed space flows from the first chamber A to the second chamber B or vice versa. Since surfaces of the movable member 55 provided in the space of the partition member 5 is subjected to the fluid pressures inside the chambers A and B through the through holes 54 formed in the two plates 51 and 52, it is moved along the direction of flow of the liquid upon the relative movement between the first and second support members 1 and 2. When the amount of this relative movement (i.e., the magnitude of vibration) is small and the amount of displacement of the movable member 55 is smaller than an allowable value, i.e., the value obtained by subtracting the thickness of the movable member 55 from the distance between the plates 51 and 52, the movable member 55 freely moves between the plates 51 and 52 of the partition member 5 upon the relative movement between the first and second support members 1 and 2. Then, no pressure difference is established between the first and second chambers A and B, and the engine is elastically supported by the rubber block 3. When the magnitude of the vibrations is increased, the amount of relative movement between the first and second support members 1 and 2 is increased and a pressure difference is established so as to cause the movable member 55 to move exceeding an allowable distance, and the movable member 55 is urged against one of the plates 51 and 52 and closes the through holes 54 formed in the plate against which it is abutted. Referring to FIG. 1, when the second member 2 is moved downward, the movable member 55 is urged against the second plate 52 and the pressure inside the first chamber A is increased. Then, the liquid portion inside the first chamber A flows into the second chamber B through the fluid passages 7. Since the liquid portion flowing between the two chambers in this manner is subjected to the flow resistance which is determined by the cross-sectional area, length and number of the fluid passages 7, the amount of relative movement between the first and second support members 1 and 2 which is caused by the magnitude of the vibration is decreased, and the vibrations are thus damped. At the same time, while the flow resistance imparted by the flow passages 7 is acting on the liquid, an effect similar to that obtained when liquid is filled in the first chamber A is imparted to the rubber block 3, the overall damper device is in a condition having high stiffness as an engine suspension.

Since the fluid passages 7 for imparting resistance to the flow of the liquid are formed in the cylindrical base portion 12 of the main frame 11 of the first support member 1 and at positions which are not effected by the partition member 5, and in particular, to its movable member 55, the cross-sectional area, length and number of fluid passages can be freely determined. Therefore, the flow resistance to be imparted to the flow of the liquid can be determined at a desired value.

A damper device to be used in an engine suspension of a vehicle is typically subject to the following types of vibration:
 (a) Cranking when the engine is started
  5–15 Hz
 (b) Idling of the engine
  5–15 Hz
 (c) Shaking vibrations due to uneven road surface during vehicle travel
  5–30 Hz
 (d) Vibrations due to torque change during vehicle travel
  30–200 Hz Among these different types of vibration, cranking vibrations in item (a) above are generated when the engine is started upon driving of the starter motor. Therefore, the cranking vibrations have not only irregular waveforms and intervals but also have a large magnitude of vibration, therefore, it is preferable to keep the engine suspension stiff during cranking.

The idling vibrations of the engine in item (b) above have a low frequency and a large magnitude of vibration and are smoother than the cranking vibrations. However, idling of the engine is performed during a non-drive state of the vehicle, the engine suspension is insulated from the drive system of the vehicle by a clutch or a torque converter. Therefore, due to the characteristics of an internal combustion engine, it is preferable to keep the engine suspension flexible so as to elastically supporting the engine and to allow the engine freely vibrate.

In the case of vibrations of items (c) and (d) above, as for the vibrations of a small magnitude, it is preferable to keep the engine suspension stiff in accordance with the magnitude of vibrations.

The engine vibrations or vibrations transmitted to the engine suspension from the flat surface of a road during normal travel of the vehicle have a high frequency and a small magnitude of vibration. In this case, the amount of displacement of the movable member 55 in the partition member 5 is very small. Therefore, the engine suspension is flexibly supported by the resiliency of the rubber block 3.

When the vehicle travels on an uneven road, vibrations of item (c) above are transmitted to the engine suspension. When the torque variation of the engine is large, vibrations of a low frequency and of large magnitude of vibration as in item (d) above are transmitted to the engine suspension. Then, the amount of displacement of the movable member 55 of the partition member 5 exceeds an allowable value, and liquid flow between the first and second chambers A and B occurs through the fluid passages 7. Therefore, the vibrations of large magnitude are damped and the engine suspension is held stiff.

When the engine is started, the engine is driven by the starter motor, and impulse-like vibrations of a large magnitude upon ignition and explosion of fuel are transmitted to the engine suspension. The vibrations of item (a) above are thus produced. Since the crankshaft of the engine is positively driven in this case, it is preferable to keep the engine suspension stiff. In this embodiment, when vibrations of large magnitude are transmitted due to cranking, the amount of displacement of the movable member 55 in the partition member 5 exceeds the allowable value to generate an instantaneous pressure difference between the first and second chambers A and B. Therefore, the engine suspension can be held stiff.

Figure 2:
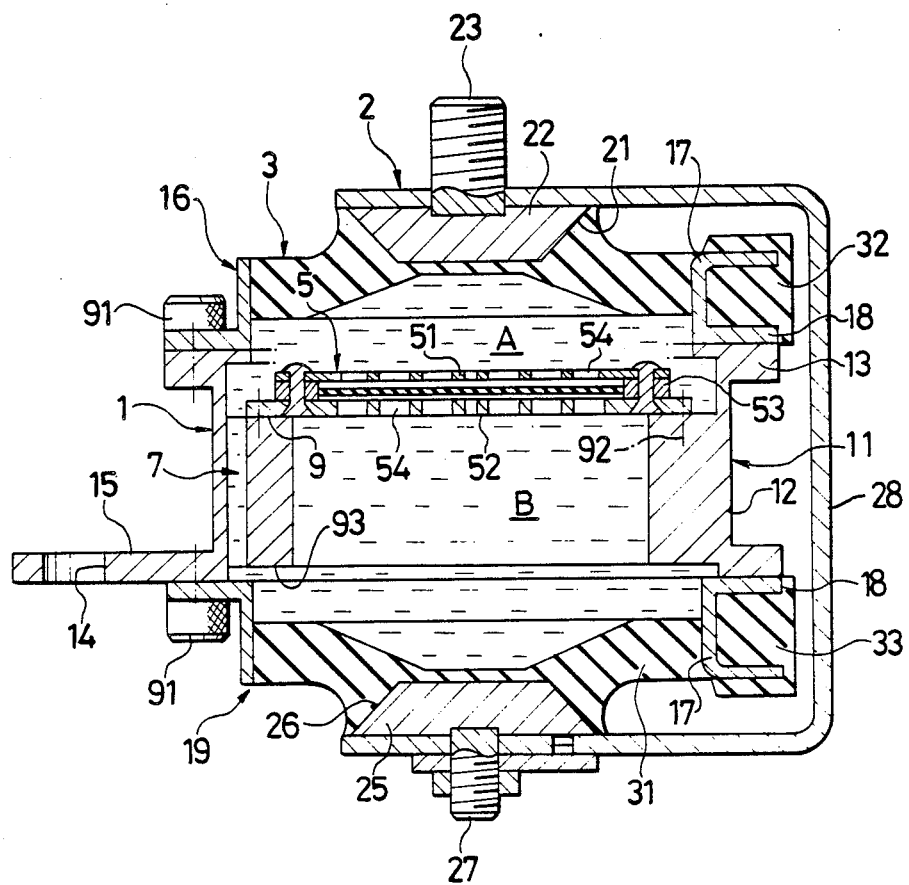
FIG. 2 is a sectional view showing a second embodiment of the present invention.

FIG. 2 is a sectional view showing a second embodiment of the present invention wherein the present invention is applied to an engine suspension of a vehicle. The second embodiment is similar to the first embodiment shown in FIG. 1 except for the following details. The rubber bottom plate 10 fixed to the lower frame 19 in the first embodiment is replaced with a rubber block 31 of the same material and structure of the rubber block 3. The rubber block 31 is arranged such that its mean surface is within a plane perpendicular to the central axis of the inner circumferential surface of the cylindrical base portion 12 of the main frame 11. The outer circumferential surface of the rubber block 31 is fixed and coupled to the inner wall of the cylindrical portion 17 of the lower frame 19. A disk-shaped third support member 25 is buried in a central portion of the rubber block 31 and has on its outer circumference a frustoconical surface 26 having the same shape as that of the main body 22 of the second support member 2. A bolt 27 extends from the third support member 25 to be coaxial with the bolt 23 extending from the main body 22. The third support member 25 and the main body 22 are connected to each other by connecting member 28 of a metal and having a suitable width and a U-shape. Rubber stoppers 32 and 33 are arranged at the portions of the cylindrical portions 17 of the upper and lower frames 16 and 19 which oppose the connecting member 28 so as to be formed integrally with the rubber blocks 3 and 31. The other portions shown in FIG. 2 bearing the same reference numerals denote the same portions shown in FIG. 1, and a detailed description thereof is omitted.

In this embodiment, an end of the first support member 1 which is at the opposite side of the rubber block 3 is closed by the rubber block 31 of the same material and shape as those of the block 3. The third support member 25 coupled to the rubber block 31 is connected to the second support member 2 through the connecting member 28. Therefore, the third support member 25 moves integrally with the second support member 2 relative to the first support member 1. The rubber block 31 is deformed by the same amount as the rubber block 3. The volume of the sealed space therefore does not practically change upon transmission of vibrations, and the engine suspension has tenderness based on elasticity of the two rubber blocks 3 and 31.

In this embodiment, identical parts can be used for the upper and lower frames 16 and 19 of the first support member 1 so as to stabilize product quality. In addition, this embodiment provides the same functions and advantages of the embodiment shown in FIG. 1. Further, the stoppers 32 and 33 abut against the connecting member 28 so as to protect the engine suspension when vibrations having a magnitude exceeding a value designed in accordance with design values of the partition member 5 and the fluid passages 7 are subjected thereto.

Still another embodiment of the present invention will be described with reference to the accompanying drawings. The first and second embodiments serve well as damper devices against vibrations given in items (a), (c) and (d) above. However, for vibrations in the idling state of an engine in item (b), the damper devices of these embodiments provide stiff engine suspensions similar to the cranking state of the engine as in item (a) above. However, the following embodiments can provide a flexible engine suspension which damp vibrations in the idling mode of the engine in item (b) above so that the damper device can be effective against any type of vibration.

A third embodiment will be described with reference to a sectional view shown in FIG. 3 in which the present invention is applied to a fluid-filled damper device as an engine suspension for supporting and fixing an engine to a body or a frame of a vehicle.

This embodiment has the following features in addition to those of the first embodiment shown in FIG. 1. A solenoid 4 is arranged inside the inner wall of a cylindrical base portion 12 of a main frame 11 of a first support member 1. A partition member 5 is interposed between the solenoid 4 and a second support member 2. The partition member 5 is supported with respect to the first support member 1 by an elastic sheet comprising a flexible, elastic material. When the solenoid 4 is energized, the partition member 5 is attracted thereby and is adherently held to the first support member 1 so as to divide the sealed space into first and second chambers A and B.

An annular chamber 41 opening to the surface of a stepped portion 9 is formed in the cylindrical base portion 12 of the main frame 11. The solenoid 4 having a winding in an annular form housed in an annular casing of a magnetic material is disposed in the chamber 41. The opening of the chamber 41 is liquid-tightly sealed by a filler 42 of a synthetic resin material and forms an attraction/fixing surface 43 of the solenoid 4. Instead of inserting the solenoid 4 in the chamber 41, an independently prepared solenoid can be fixed at its outer circumferential surface to the inner wall of the cylindrical base portion 12. A wire 44 connects the winding of the solenoid 4 to a DC power supply through a switch (neither being shown). The wire 44 extends into a protective cover 46 liquid-tightly and externally fixed to the circumferential wall of the cylindrical base portion 12 through a hole 45 formed therein and then extends liquid-tightly and externally from the protective cover 46. The attraction/fixing surface 43 of the solenoid 4 is formed in a plane perpendicular to the central axis of the inner wall surface of the cylindrical base portion 12 so as to be even with the stepped portion 9.

An annular support plate 61 is liquid-tightly fixed between the flange 13 of the main frame 11 of the first support member 1 and the flange 18 of the upper frame 16. The inner peripheral edge of the support plate 61 extends into the sealed space. The outer peripheral edge of the partition member 5 is fixed to the inner peripheral edge of a thin rubber sheet 6 of an annular shape and fixed by the outer peripheral edge of the sheet 6 to the inner peripheral edge of the support plate 61. Thus, the partition member 5 is suspended so as to be movable for a slight distance along the central axis of the cylindrical base portion 12 of the main frame 11 by the elasticity of the rubber sheet 6. A flat plate 52 defining a surface of the partition member 5 which opposes the solenoid 4 is made of a magnetic material such as iron. The flat plate 52 is suspended by the rubber sheet 6 such that it is at a distance of about 0.3 to 1.5 mm from the attraction/fixing surface 43 of the solenoid 4 when the solenoid 4 is deenergized. Instead of forming the flat plate 52 of the partition member 5 with a magnetic material, flat plates 51 and 52 can be fixed together with a spacer 53 by a number of screws of a magnetic material. Through holes 62 are formed at equal intervals along the circumferential direction of the rubber sheet 6.

Figure 3:
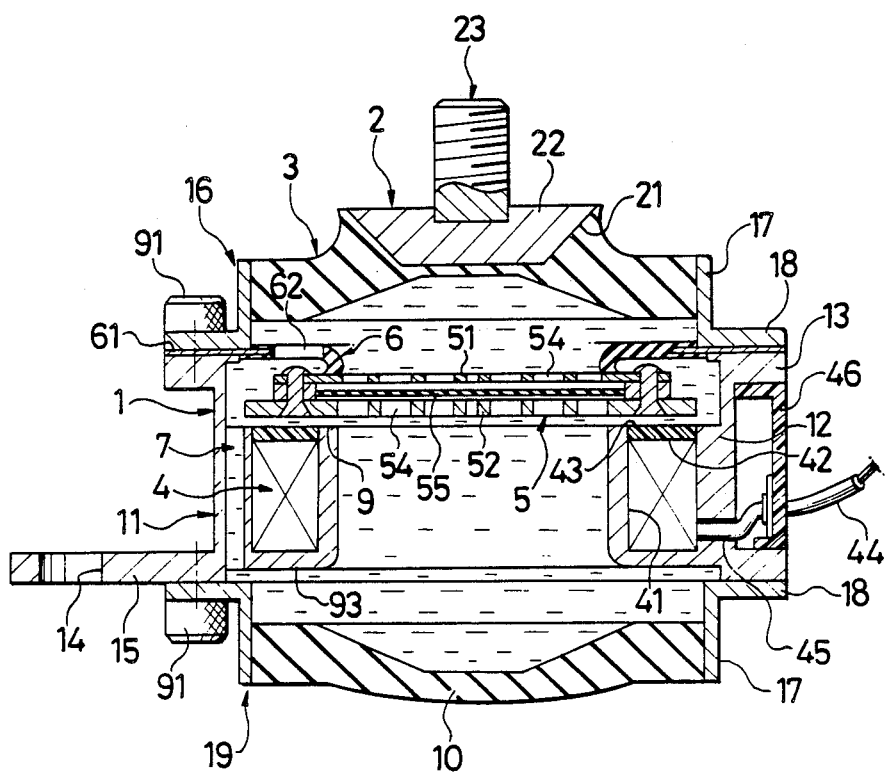
FIG. 3 is a sectional view showing a state of a third embodiment of the present invention wherein a solenoid provided in this embodiment is deenergized.

The same reference numerals as in FIG. 1 denote the same portions shown in FIG. 3, and thus a detailed description thereof will be omitted.

Figure 4:
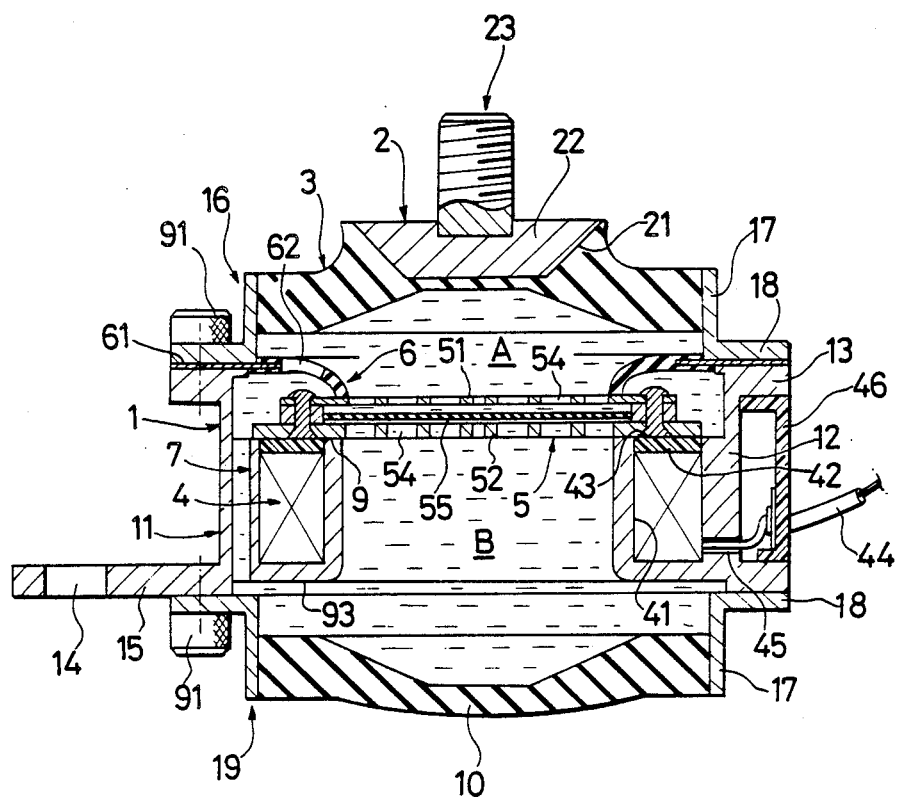
FIG. 4 is a sectional view showing a state of said third embodiment wherein the solenoid provided in the embodiment is energized.

In this embodiment, when the winding of the solenoid 4 is connected to the DC power supply and is energized, as shown in FIG. 4, the partition member 5 is attracted to the attraction/fixing surface 43 of the solenoid 4 and adherently held to the first support member 1. Thus, the partition member 5 causes the sealed space to be divided into first and second chambers A and B, and the fluid-filled damper device of this embodiment provides the same functions and advantages of the device applied to an engine suspension as shown in FIG. 1.

In this embodiment, when connection between the winding of the solenoid 4 and the power supply is interrupted and the solenoid 4 is deenergized, the partition wall 5 is separated from the attraction/fixing surface 43 of the solenoid 4 and does not divide the sealed space into the two chambers, as shown in FIG. 3. In this state, irrespective of the magnitude of the vibrations applied between the first and second support members 1 and 2, the partition member 5 freely swings in the liquid and the damper effect due to the flow resistance through the fluid passages 7 does not occur. This state is preferable as an engine suspension in the idling mode of an engine. The vibrations in the idling mode of an engine in item (b) have a low frequency and a large magnitude of vibration. However, since the engine suspension does not provide the damper effect by the partition member 5, the engine is supported only by the elasticity of the rubber block 3, thereby providing a flexible engine suspension which allows the engine be freely oscillated.

Figure 5:
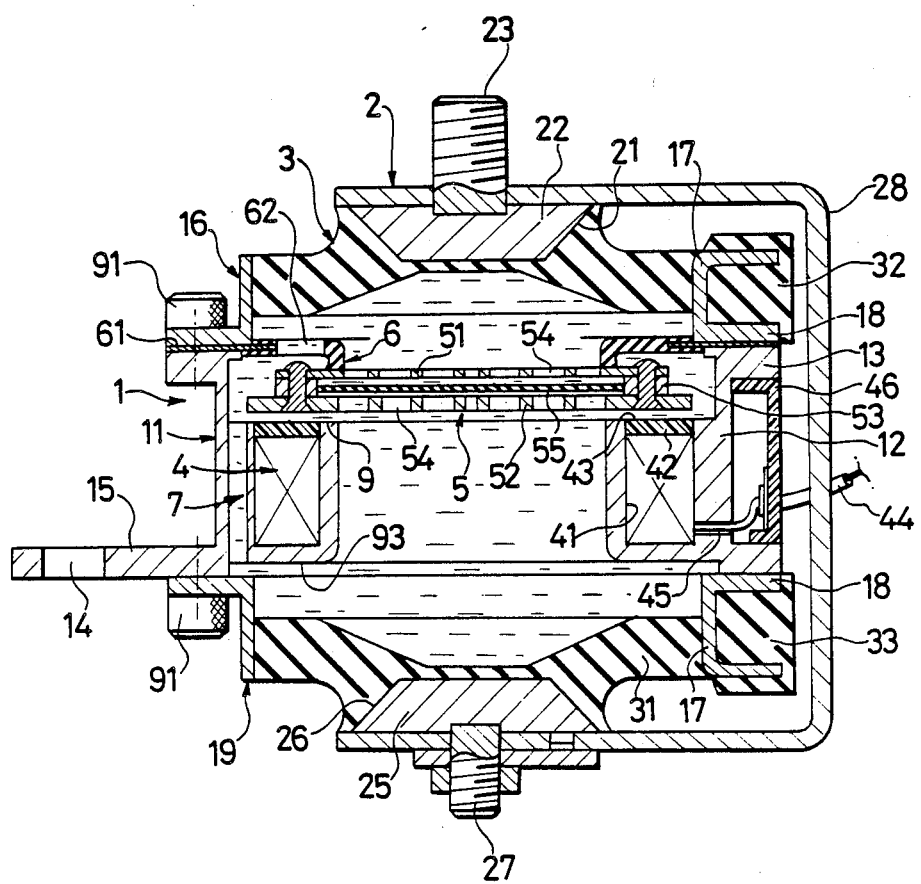
FIG. 5 is a sectional view showing a state of a fourth embodiment of the present invention wherein a solenoid provided in this embodiment is deenergized.
Figure 6:
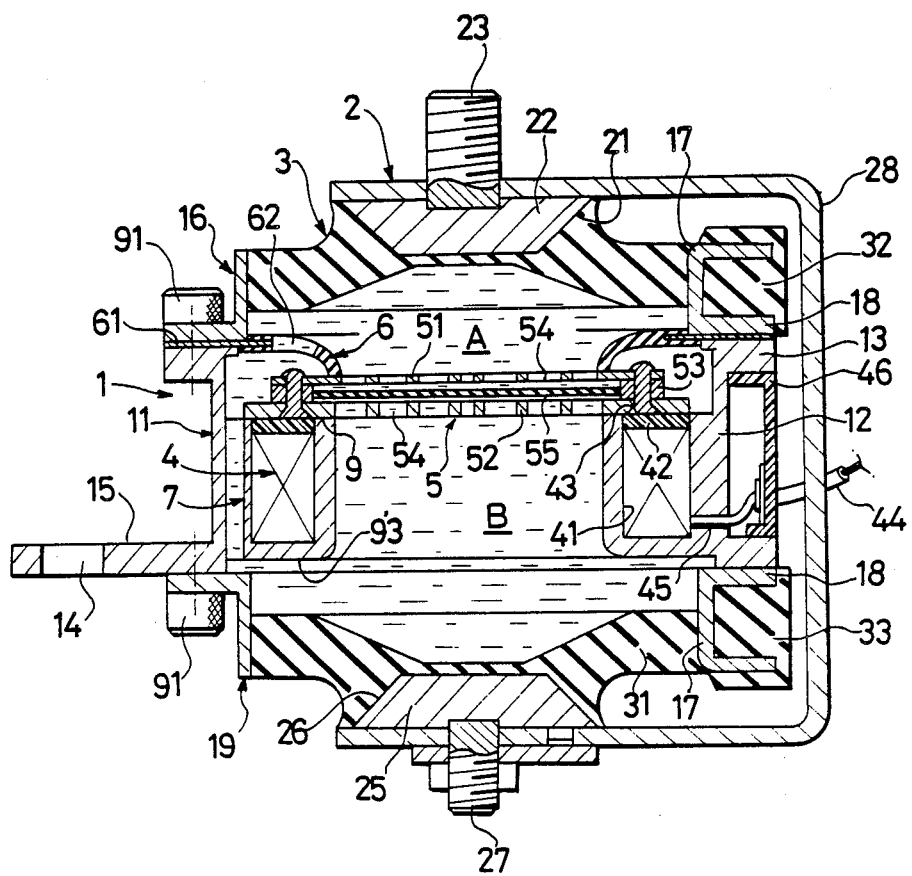
FIG. 6 is a sectional view showing a state of said fourth embodiment wherein the solenoid provided in the embodiment is energized.

FIG. 5 shows a fourth embodiment wherein the present invention is applied to an engine suspension. In this embodiment, the rubber bottom plate 10 of the lower frame 19 and the rubber block 3 in the embodiment shown in FIG. 3 are replaced with the rubber blocks 31 and 3 shown in FIG. 2, and a connecting member 28 connects a second support member 2 to a third support member 25 fixed to the rubber block 31. The same reference numerals as in FIGS. 3 and thus 2 denote the same portions in FIG. 5, and a detailed description thereof will be omitted.

In this embodiment, when a partition member 5 is attracted to an attraction/fixing surface 43 of the solenoid 4 and adherently held to the first support member 1, such provides the same functions and advantages as those of the engine suspension shown in FIG. 2. When the solenoid 4 is deenergized and the partition member 5 is supported and suspended at a position away from the attraction/fixing surface 43 of the solenoid 4, this embodiment provides a tender flexible engine suspension similar to that described with reference to FIG. 3 which prevents vibrations in the idling mode of an engine.

In the third and fourth embodiments of the present invention, the solenoid 4 is connected to the DC power supply through a switch. When the engine is in the cranking mode by a starter motor or when the vehicle is travelling, the switch is turned on to energize the solenoid 4. When the engine is in the idling mode, the switch is turned off to deenergize the solenoid 4. Such a switch can be easily realized by one with ordinary skill in the art of this field as an automatic switch where a parallel circuit consisting of an ignition switch as a main switch of the vehicle for setting the vehicle in the cranking mode and a switch turned on upon detection of rotation of the crankshaft or speedometer and turned off upon detection of interruption of such rotation is inserted between the solenoid 4 and the DC power supply.

The present invention thus provides a fluid-filled damper device comprising two support members, one of which is coupled to a support element and the other of which is coupled to a suspended element; a thick elastic block, which is fixed by an outer peripheral edge thereof to a first support member between the two support members and by a substantially central portion thereof to a second support member between the two support members so as to elastically couple the first and second support members for allowing relative movement therebetween in at least one direction; a sealed space surrounded by at least the thick elastic block, an elastic bottom plate sealing an end of the first support member which is opposite to the side of the second support member and the first support member; liquid filled in said sealed space; and a partition member which is arranged in the sealed space and has therein a movable member responsive to flow of the liquid upon the relative movement of the first and second support members in one direction. Therefore, when vibrations having a high frequency and a small magnitude of vibration are transmitted to the damper device through the support and the suspended elements, the movable member is moved for a distance corresponding to the magnitude of the vibrations so as to compensate for deformation of the elastic block and to maintain the stiffness of the block very low. However, when vibrations have a low frequency and a large magnitude of vibration and displacement of the movable member in the partition member alone cannot compensate for such deformation, the liquid is allowed to flow from one chamber of the sealed space into the other chamber defined by the partition wall so as to impart flow resistance to the liquid, thereby damping the vibrations.

According to the present invention, at least one fluid passage for allowing the liquid to flow from one chamber of the sealed space into the other chamber defined by the partition member is formed in the wall portion constituting the first support member so as to allow the two chambers of the sealed space which are partitioned by the partition member to communicate and to impart flow resistance to the liquid flowing therethrough. With this arrangement, the cross-sectional area, length and number of fluid passages can be arbitrarily selected, and positions for forming such fluid passage or passages can be selected from a wider area.

When the periphery of the partition member is fixed to the first support member to divide the sealed space into the first and second chambers, the present invention provides a simple damper device which can provide a tender damper effect against vibrations of high frequency and small magnitude of vibration and a stiff damper effect against vibrations of low frequency and a large magnitude of vibration, by the displacement of the movable member which is to be movable for a small distance along the direction of relative movement in the partition member and by the fluid passages which are formed in the wall portion constituting the first support member and which allow the first and second chambers to communicate with each other to allow flow of liquid for damping those vibrations and further allowing formation of fluid passages independent of the configuration of the partition member and easy setting of the flow resistance.

Further, in accordance with the present invention, the solenoid having an opening at the central portion thereof and the attraction/fixing surface thereof being substantially perpendicular to the one direction of relative movement is arranged in the inner wall of the first support member. The partition member is interposed between the attraction/fixing surface of the solenoid and the elastic block. The outer peripheral edge of the elastic sheet of a flexible, elastic material is fixed to the first support member, and the inner peripheral edge of the elastic sheet is fixed to the outer peripheral edge of the partition member. Thus, the partition member is movable along the direction of relative movement between the first and second members, so that when the solenoid is energized, the partition member is adherently held to the attraction/fixing surface of the solenoid against the elasticity of the elastic sheet so as to divide the sealed space into the first and second chambers. With this arrangement, with vibrations which need not be damped, the solenoid is deenergized. Then, the partition member is separated from the attraction/fixing surface of the solenoid by the elasticity of the elastic sheet, and the sealed space forms a single chamber in which liquid does not flow. Thus, the damper device damps vibrations only by the damper effect of the thick elastic block consisting of a flexible, elastic material. However, with vibrations which require absorption/damping, the solenoid is energized so as to attract the partition member to the attraction/fixing surface of the solenoid and to adherently hold it to the first support member, thereby providing the same effect as in the case wherein the partition wall is fixed to the first support member.

In this manner, when the solenoid is energized, while vibrations transmitted to the damper device are vibrations having a small magnitude of vibration, they are damped by flexibility or low stiffness of the block. However, when the magnitude of the vibrations exceeds a predetermined value, the stiffness of the damper device is increased by the flow resistance of the fluid passages formed in the first support member. When the solenoid is deenergized, the function of the fluid passages is not provided in the damper device and vibrations are absorbed only by a tender damper effect of the elastic block.

In the embodiments described above, the first and second support members are cylindrical. However, according to the basic principle of the present invention, the cross-section of the first and second support members is not limited to a circle and can have other shapes such as a polygon.

What is claimed as new and desired to be secured by Letters of Patent of the United States is:

1. A fluid-filled damper device comprising:
   two support members, consisting of a first support member to be coupled to a support element and a second support member to be coupled to a suspended element;
   a thick elastic block comprising a deformable, elastic material and having an outer peripheral edge fixed to the first support member and a substantially central portion fixed to the second support member for elastically coupling said first and second support members so as to allow relative movement therebetween in at least one direction wherein a sealed space is formed surrounded by at least said thick elastic block,
   an elastic bottom plate for sealing an end of said first support member which is opposite to the side of said second support member and said first support member wherein a liquid is disposed in said sealed space;
   a solenoid arranged at an inner wall of said first support member, said solenoid having a space at a central portion thereof and an attractive/fixing surface substantially perpendicular to said one direction of relative movement;
   a plate-shaped partition member interposed between said attractive/fixing surface of said solenoid and said elastic block, and having an outer peripheral edge thereof fixed to an inner peripheral edge of an elastic sheet made of a deformable, elastic material which is fixed at an outer peripheral edge thereof to said first support member, and a movable member movably provided in the interior thereof for a short distance along said one direction of relative movement, said partition member being movable along said one direction of relative movement by the deformation of said elastic sheet; and at least one fluid passage formed in a wall portion constituting said first support member, said fluid passage having open ends each of which is opening in said sealed space at each of both side positions of said attraction/fixing surface of said solenoid along said one direction of relative movement, respectively, and imparting flow resistance to the liquid flowing therethrough, whereby said partition member is adherently held to said attraction/fixing surface of said solenoid against elasticity of said elastic sheet by excitation of said solenoid so as to divide said sealed space into first and second chambers, and wherein said fluid passage communicates between said first and second chambers.

2. A damper device according to claim 1, wherein said elastic bottom plate sealing the end of said first support member is formed in a form of a thick elastic block made of a deformable, elastic material and fixed at a substantially central portion thereof to a third support member, and said third support member is integrally connected to said second support member through a connecting member.

3. A damper device according to claim 1 or 2, wherein said partition member comprises two flat plates each consisting of a thin plate and having a number of through holes at a substantially central portion thereof and a spacer interposed therebetween along an entire circumference thereof, and said movable member being formed with a thin plate of a size which can close all of said through holes formed in said two flat plates and is inserted in a space defined by said spacer and said two flat plates so as to be movable along said one direction of relative movement between said first and second support members.

* * * * *